United States Patent
Edlabadkar et al.

(10) Patent No.: US 11,575,310 B2
(45) Date of Patent: Feb. 7, 2023

(54) POWERED SYSTEM WITH PASSIVE FILTER FOR AN ENERGY STORAGE DEVICE

(71) Applicant: Transportation IP Holdings, LLC, Norwalk, CT (US)

(72) Inventors: Nikhil Edlabadkar, Bengaluru (IN); Ajith Kuttannair Kumar, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/351,882

(22) Filed: Jun. 18, 2021

(65) Prior Publication Data

US 2021/0408893 A1    Dec. 30, 2021

Related U.S. Application Data

(60) Provisional application No. 63/045,972, filed on Jun. 30, 2020.

(51) Int. Cl.
| | | |
|---|---|---|
| *H02M 1/14* | (2006.01) | |
| *H02M 1/12* | (2006.01) | |
| *H02M 7/523* | (2006.01) | |

(52) U.S. Cl.
CPC ............ *H02M 1/14* (2013.01); *H02M 1/126* (2013.01); *H02M 7/523* (2013.01)

(58) Field of Classification Search
CPC ......... H02M 1/14; H02M 1/126; H02M 7/523
See application file for complete search history.

(56) References Cited

U.S. PATENT DOCUMENTS

| | | | |
|---|---|---|---|
| 9,899,877 B2 | 2/2018 | Mitcheson et al. | |
| 2016/0315552 A1 | 10/2016 | Nishimoto et al. | |
| 2016/0380546 A1 | 12/2016 | Wang et al. | |
| 2022/0080834 A1* | 3/2022 | Edlabadkar | B60L 7/14 |

FOREIGN PATENT DOCUMENTS

JP    2003153542 A1    5/2003

OTHER PUBLICATIONS

Balog et al., "Coupled Inductors—A Basic Filter Building Block" Jan. 2013, IEEE Transactions on Power Electronics 28(1):537-546.
Search Report dated May 11, 2021 for corresponding European Application No. 21182923.9-1201 (9 pages).
Examination Report dated Feb. 25, 2022 for corresponding Indian Application No. 202114028470 (6 pages).

* cited by examiner

*Primary Examiner* — Adolf D Berhane
(74) *Attorney, Agent, or Firm* — The Small Patent Law Group LLC; Christopher R. Carroll (57) ABSTRACT

A system may be provided that includes an energy storage device, and an inverter electrically coupled to the energy storage device. The system also includes a passive filter electrically coupled between the energy storage device and the inverter. The passive filter includes a first coupled-inductor and at least one first bypass capacitor. The first coupled-inductor includes at least two magnetically coupled windings. The passive filter is configured to reduce or eliminate alternating current at the energy storage device.

19 Claims, 7 Drawing Sheets

POWERED SYSTEM WITH PASSIVE FILTER FOR AN ENERGY STORAGE DEVICE

CROSS-REFERENCE TO RELATED APPLICATIONS

This application claims priority to U.S. Provisional Application No. 63/045,972, which was filed on 30 Jun. 2020, and the entire disclosure of which is incorporated herein by reference.

BACKGROUND

Technical Field

The present disclosure relates to a system with a passive filter for an energy source.

Discussion of Art.

In powered systems such as electric vehicles, hybrid vehicles, or energy storage systems (e.g., stationary powered systems), energy sources (e.g., batteries) are typically connected to a system direct current (DC) bus through a converter (e.g., a DC-DC converter, or the like). The DC-DC converter can control conduction of power to and from the energy sources and decouples the energy sources from ripple current that may propagate from other switching power converters connected to a DC bus of the powered system. The DC-DC converter can involve significant added cost and power, however, due to the DC-DC converter needing to process the full power flow in the path of the battery.

An alternative method directly connects the energy source to the DC bus, which can vary in voltage depending on system conditions and the state of charge of the energy source. This avoids the cost of a DC-DC conversion stage or converter. The energy source, however, is exposed to variable frequency current ripple associated with different modes of converter operation (e.g., pulse width modulation, square wave operation) that may be present on the DC bus. As one example, in a vehicle application, the traction inverter of the vehicle propulsion system may subject batteries to switching frequency ripple. This can lead to added power losses, heating in the battery, and degrade battery performance and life. Addressing this significant ripple can be problematic. Some prior art systems include lumped inductors to limit ripple components, which are undesirable as described herein.

BRIEF DESCRIPTION

In accordance with one embodiment, a system is provided that includes an energy storage device and an inverter electrically coupled to the energy storage device. The system also includes a passive filter electrically coupled between the energy storage device and the inverter. The passive filter includes a first coupled-inductor and at least one first bypass capacitor. The first coupled-inductor includes at least two magnetically coupled windings. The passive filter may reduce or eliminate alternating current at the energy storage device.

In accordance with one embodiment, a device is provided that includes a passive filter. The passive filter includes a first coupled-inductor and at least one first bypass capacitor. The first coupled-inductor includes at least two magnetically coupled windings. The passive filter includes one less of the at least one first bypass capacitor than a number of the at least two magnetically coupled windings. Each of the at least one first bypass capacitor is coupled in series with a corresponding winding of the at least two magnetically coupled windings to define a series resonant circuit having a determined notch frequency. The passive filter may be insertable in a system including an energy storage device coupled to a converter and a lumped reactor. The passive filter may reduce or eliminate alternating current at the energy storage device.

In accordance with one embodiment, a system is provided that includes at least two batteries (or, alternatively, only two batteries) connected in series and an inverter electrically coupled to the two batteries. The system also includes at least one passive filter electrically coupled between the two batteries and between the batteries and the inverter. The at least one passive filter includes a first coupled-inductor and a second coupled-inductor. The first coupled-inductor and the second coupled-inductor each include at least two magnetically coupled windings. The passive filter may reduce or eliminate alternating current at the batteries.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a power converter system for reducing ripple current within a powered system, such as a mobile powered system or a stationary powered system. The power converter system may include an energy storage device coupled to a converter. The converter may be a DC-DC converter, an alternating current (AC)-DC converter, a DC-AC converter, or the like. In an example, the power converter system may form at least part of a drive for a vehicle that includes an energy storage device coupled to an inverter. The power converter system includes a passive filter coupled between the converter and the energy storage device to reduce ripple current in the system. The passive filter can include a coupled-inductor that includes at least two magnetically coupled windings or at least two magnetically coupled windings and a bypass capacitor. The passive filter can be coupled between the energy storage device and the converter. In some embodiments, the passive filter may provide relatively greater attenuation of alternating currents (e.g., ripple currents) at or near designated frequencies compared to some known filters receiving the same voltage and currents. Additionally or alternatively, this passive filter may have a reduced size, reduced weight, and/or reduced cost compared to some known filters.

Figure 1:
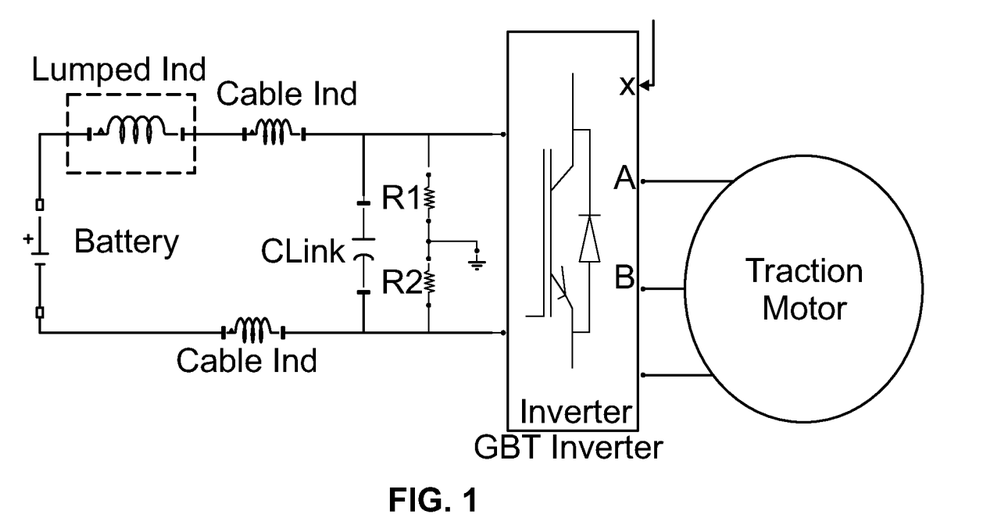
FIG. 1 illustrates a schematic diagram of one example power converter system.
Figure 2:
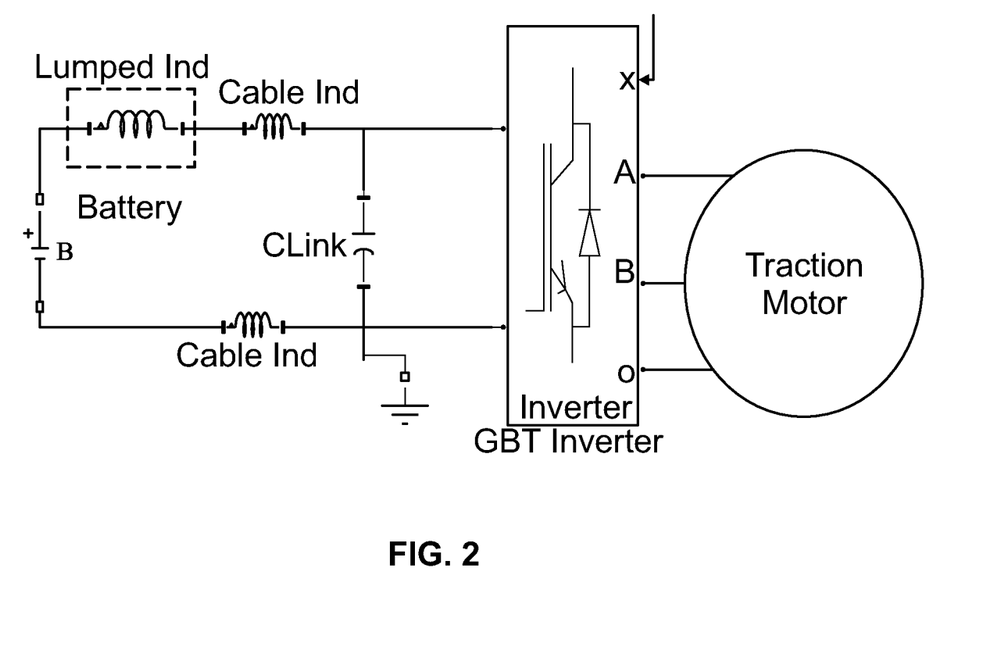
FIG. 2 illustrates a schematic diagram of another example power converter system.

FIGS. 1 and 2 schematically illustrate example power converter systems fed by an energy storage device (e.g., a battery) and that include a lumped inductor for filtering ripple components. The power converter system of FIG. 1 includes a DC bus that is grounded through a high impedance connection to a mid-point ground. The power converter system of FIG. 2 includes a DC bus that is grounded at one end. The battery (or battery string) is, in both cases, connected to a traction inverter DC bus through the lumped inductor and/or inductance that is inherent to the connecting cables. Large inductances provided by lumped inductors can induce resonance in the power converter system. The resonance induced by these large inductances can induce micro cycling of the battery, leading to reduced battery life. The resonant condition can be difficult to avoid if the inverters in the power converter system are operated over a varying range of frequencies, as would be common for traction drives. In addition, lumped inductors can be sizeable, difficult to accommodate in tight spaces, expensive, and heavy.

Figure 3:
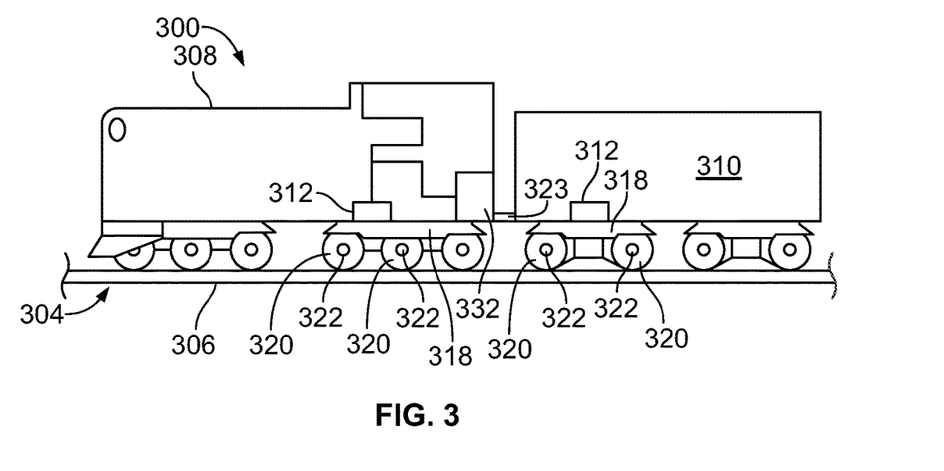
FIG. 3 illustrates a schematic diagram of an example powered system.

FIG. 3 illustrates a schematic diagram of a vehicle system 300. The vehicle system may travel along a route 304 on a trip from a starting or departure location to a destination or arrival location. The vehicle system includes at least one propulsion-generating vehicle and optionally, one or more non-propulsion-generating vehicles. For example, the vehicle system may include a propulsion-generating vehicle 308 and a non-propulsion-generating vehicle 310 that are mechanically interconnected to one another to travel together along the route. In one or more examples, the vehicle may be a hybrid locomotive, hybrid truck, automobile, agricultural vehicle, mining vehicle, marine vessel, or the like. In another example the vehicle may be an "energy storage device only" (e.g., "battery only" or energy tender) powered vehicle.

The propulsion-generating vehicle 308 may generate tractive efforts to propel (for example, pull or push) itself and, optionally, the non-propulsion-generating vehicle 310 along the route. The propulsion-generating vehicle includes a propulsion subsystem, including one or more traction motors, that generates tractive effort to propel the vehicle system. The propulsion-generating vehicle also includes a braking system 312 that generates braking effort for the vehicle system to slow down or stop itself from moving. Optionally, the non-propulsion-generating vehicle includes a braking system but not a propulsion subsystem. The propulsion-generating vehicle may be referred to herein as a propulsion vehicle, and the non-propulsion-generating vehicle may be referred to herein as a car. Although one propulsion vehicle and one car are shown in FIG. 3, the vehicle system may include multiple propulsion vehicles and/or multiple cars. In an alternative embodiment, the vehicle system only includes the propulsion vehicle such that the propulsion vehicle is not coupled to the car or another kind of vehicle.

Suitable mobile powered systems may include vehicles. Suitable vehicles may include rail vehicles, marine vessels, automobiles, on-road trucks, agricultural or industrial vehicles, mining vehicles, aircraft, and the like. Suitable stationary powered systems may include pumps and power generators. Suitable power generators may include wind turbines, hydroelectric generators, power generators, lifts, hoists, and the like. In the illustrated embodiment, the vehicle system is shown as a rail vehicle system, and the route is a track formed by one or more rails. The propulsion vehicle 308 is a locomotive, and the non-propulsion vehicle 310 is a rail car that carries passengers and/or cargo. Other propulsion vehicles may be another type of rail vehicle other than a locomotive. In an alternative embodiment, the vehicle system may include one or more automobiles, trucks, marine vessels, aircraft, mining vehicles, agricultural vehicles, or other off-highway vehicles (OHV) system (e.g., a vehicle system that is not legally permitted and/or designed for travel on public roadways), or the like. Additionally or alternatively, the non-propulsion vehicle may be a trailer, a barge, or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

In the example of FIG. 3, the vehicles of the vehicle system each include multiple wheels 320 that engage the route and at least one axle 322 that couples left and right wheels together (only the left wheels are shown in FIG. 3). Optionally, the wheels and axles are located on one or more trucks or bogies 318. Optionally, the trucks may be fixed-axle trucks, such that the wheels are rotationally fixed to the axles, so the left wheel rotates the same speed, amount, and at the same times as the right wheel. The vehicles in a vehicle system may be mechanically coupled with each other, such as by couplers. For example, the propulsion vehicle can be mechanically coupled to the car by a coupler 323.

The coupler may have a draft gear to absorb compression and tension forces to reduce slack between the vehicles. Although not shown in FIG. 3, the propulsion vehicle may have a coupler located at a rear end of the propulsion vehicle and/or the car may have a coupler located at a front end of the car for mechanically coupling the respective vehicles to additional vehicles in the vehicle system. Alternatively, the vehicles in a vehicle system may not be mechanically coupled with each other, but may be logically coupled with each other. For example, the vehicles may be logically coupled with each other by the vehicles communicating with each other to coordinate the movements of the vehicles with each other so that the vehicles travel together in a convoy or group as the vehicle system. While the example embodiment of FIG. 3 illustrates a vehicle, the system may be used in stationary applications or devices, including a utility system with energy storage, or any stationary system or device utilizing energy storage.

Figure 4A:
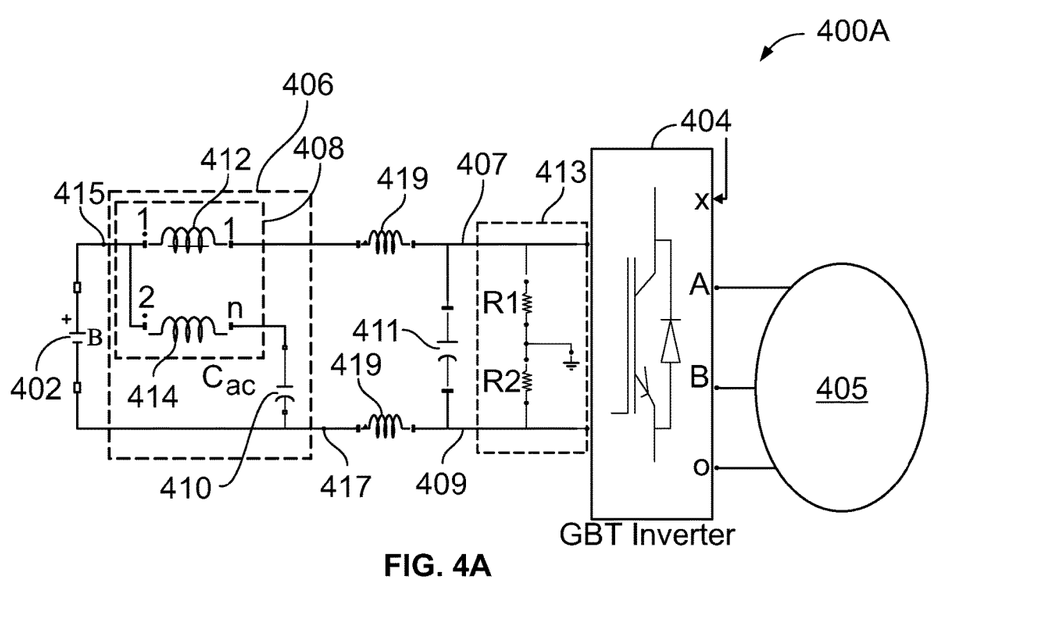
FIGS. 4A and 4B illustrate an example power converter system.
Figure 4B:
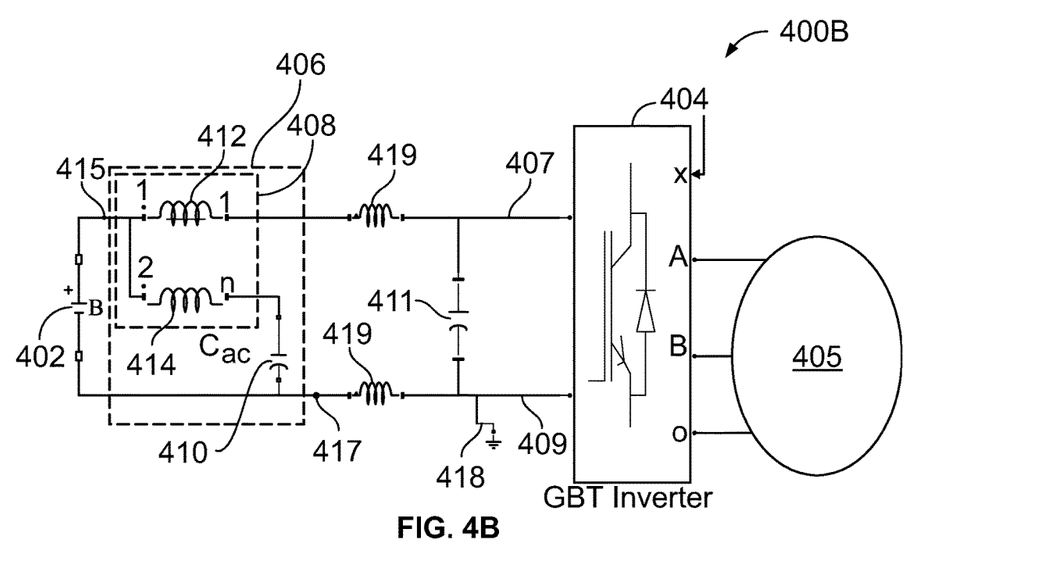

FIG. 4 illustrates a schematic diagram of an example power converter system 400A in accordance with one or more embodiments herein. In one example, the power converter system may be an electric drive system, a hybrid drive system, stationary system such as a utility system that includes energy storage, etc. The energy storage device may include one or more lithium-ion batteries, one or more nickel-metal hydride batteries, one or more lead-acid batteries, one or more ultracapacitors, or the like. The power converter system includes at least one energy storage device 402 that provides an input for a converter (e.g., a DC-DC converter, an AC-DC converter, a DC-AC converter, or the like). The converter may be an inverter 404 coupled to the at least one energy storage device 402. While in this example embodiment only one energy storage device is illustrated, a bank of energy storage devices may be provided. The bank of energy storage devices may be coupled in a series arrangement, in a parallel arrangement, include strings of energy storage devices, where the strings have energy storage devices coupled in a series arrangement and the strings themselves are coupled in a parallel arrangement, or the like. Similarly, the inverter may include plural switching elements such as metal oxide semiconductor field effect transistors (MOSFETs), insulated gate bipolar transistor (IGBTs), silicon carbide (SiCs) semiconductors, other semiconductor or transistors, or the like. In one example, the inverter may be a traction inverter used to output the alternating current for a motor 405 that provides a motive force for a vehicle. Even though an inverter is shown in the Figures, it is understood that these could be choppers, pulse width modulation (PWM) rectifiers, diode rectifiers, multi-level inverters, or the like. The power converter system 400 may include a DC bus including a first rail 407 and a second rail 409. A DC link capacitor 411 coupled between the first rail and the second rail receives current to at least partially stabilize the current flowing or conducted on (or via) the first and second rails due to inverter switching. The power converter system may include a high impedance conductive pathway 413 at a midpoint of the first and second rails of the DC bus that may be connected to a ground reference, such as may be implemented in some types of known rail vehicles. The high impedance conductive pathway 413 halves the voltage to grounding and makes protection against electric shock easier. Alternatively, the power converter system may have a conductive pathway provided on one of the two DC bus rails that may be directly connected to a ground reference, such as may be implemented in some known types of transit vehicles. Additionally, an inductance is provided in the wires of the energy storage device and in the interconnection cables and DC bus rails, and is represented in the power converter system by cable inductors 419.

Coupled between the at least one energy storage device and inverter is a passive filter 406. The passive filter may include a first coupled-inductor 408 and at least one first bypass capacitor 410. The first coupled-inductor may include at least two magnetically coupled windings 412, 414. Two or more windings may share a common core. The magnetically coupled windings may each be wrapped around a core such that the current and voltages of the windings are in phase, as indicated by the dots on the same ends of the windings. Additionally or alternatively, two or more of the at least two windings may be wound on different cores. In some examples, the passive filter may include one less bypass capacitor 410 than a number of the at least two windings. The bypass capacitor (e.g., a DC blocking capacitor) may be coupled in series with a corresponding winding of the at least two windings to define a series resonant circuit having a determined notch frequency.

A notch frequency is a frequency that is most greatly attenuated by a circuit. As used herein, the determined notch frequency is the frequency at which electrical resonance occurs in series resonant circuit (e.g., when the impedances or admittances of the bypass capacitor and the windings cancel each other). The determined notch frequency of the series resonant circuit may be selected to correspond to a value or range of values of a dominant ripple frequency related to one or more operational parameters of the inverter. These operational parameters may include, for example, a drive speed, drive power, drive switching frequency, drive mode of operation, engine or shaft rotational speed, or other frequencies that may be present on a DC bus. In a vehicle system, the traction or drive motor that is electrically coupled to a bus may be a significant determinant or source of ripple frequency. In a stationary system, the shaft speed may be the significant contributor (e.g., a wind or hydroelectric turbine). A first, dotted end of the first coupled-inductor may be coupled to a first node 415 of the passive filter. The bypass capacitor may be coupled between a second, undotted end of the first coupled-inductor and a second node 417 of the passive filter. The first node may be coupled to the first rail and the second node coupled to the second rail of the DC bus. Further, when additional strings of batteries in series and/or parallel are presented, additional first coupled-inductors and/or additional first bypass capacitors may be utilized as will be described in further detail herein.

In operation, the inverter may generate direct current and noise due to alternating currents. The passive filter receives the direct current and alternating currents from the inverter and may output the direct current to the energy storage device. The alternating currents are reduced or eliminated at the energy storage device by the passive filter. The passive filter operates to reduce or eliminate alternating currents (e.g., ripple currents) at the energy storage device by attenuating ripple currents at or near the determined notch frequency of the series resonant circuit. In operation, the first winding 412 of the coupled-inductor conducts the direct current on the DC bus to the energy storage device, while the bypass capacitor (e.g., the DC blocking capacitor) shunts the alternating currents to the second winding 414 of the coupled-inductor. The series resonant circuit, formed by the coupled-inductor and the bypass capacitor 410, provides greater attenuation of alternating currents (e.g., ripple currents) at or near the determined notch frequency compared to some known filters, such as lumped inductors. For example, the passive filter may provide attenuation of greater than −45 db/decade as compared to the attenuation of −40 db/decade provided by an example known inductive-capacitive filter. Further, additional windings of the first coupled-inductor 408, additional first coupled-inductors 408, and/or additional bypass capacitors 410 may be configured with different notch frequencies and utilized to attenuate more values and/or ranges of values of switching frequencies of the inverter as will be described in further detail herein. By providing passive attenuation of alternating currents, the voltage applied to the energy storage device may be maintained relatively constant. This may attenuate, reduce, or eliminate ripple current at the energy storage device. Additionally or alternatively, the size and/or weight of the passive filter may be reduced by up to 25% as compared to some known filters, such as lumped inductors. Further additionally or alternatively, based on a common size and/or weight, the passive filter may reduce more ripple current as compared to some known filters receiving the same voltage and currents, such as lumped inductors.

Figure 5A:
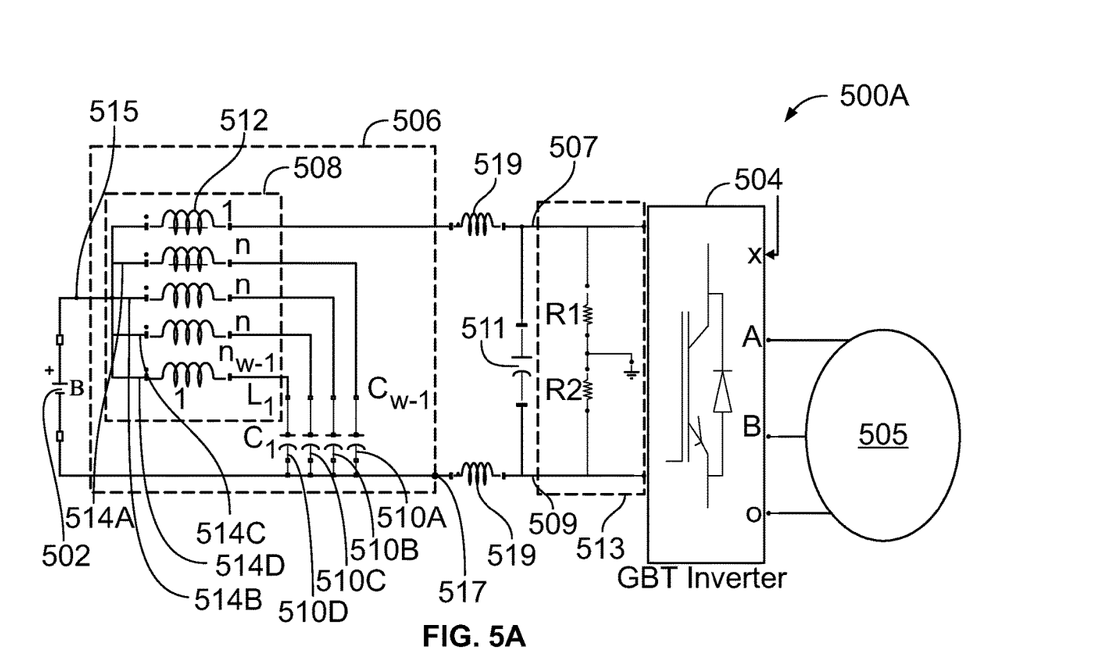
FIGS. 5A and 5B illustrate another example power converter system.
Figure 5B:
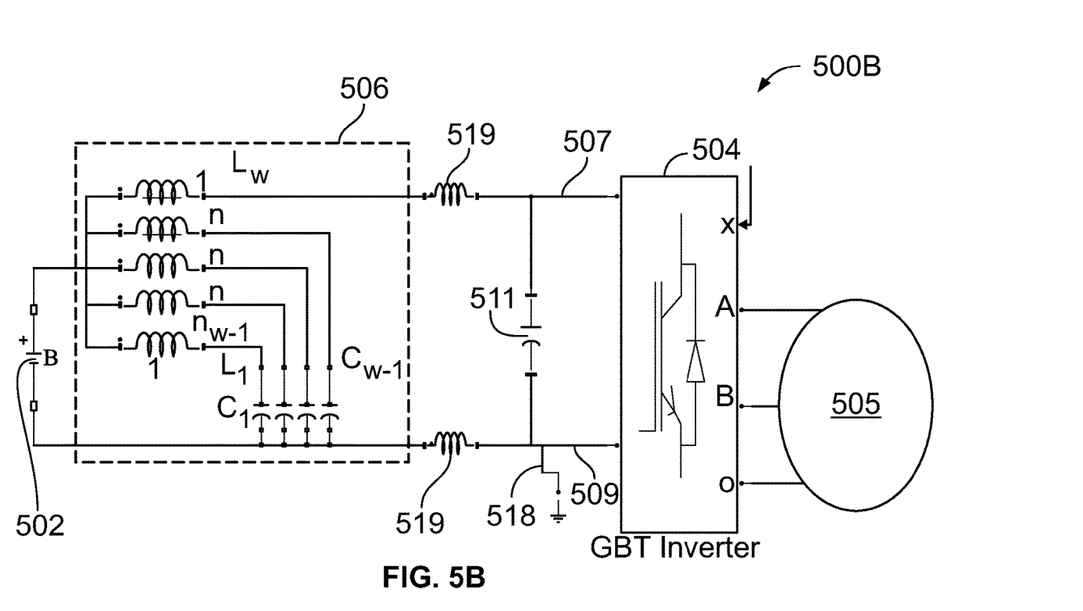

FIG. 5 illustrates a schematic diagram of another example power converter system 500A in accordance with one or more embodiments herein. The example illustrated in FIG. 5A is similar to the example of FIG. 4A, aside from the configuration of the passive filter 506. As with FIG. 4, the power converter system 500 may include a high impedance conductive pathway 513 at a midpoint of the first and second rails 507, 509 of the DC bus that may be connected to a ground reference. Alternatively, the power converter system may have a conductive pathway provided on one of the two DC bus rails configured to be directly connected to a ground reference.

Coupled between the at least one energy storage device 502 and inverter 504 is a passive filter 506. The passive filter may include a first coupled-inductor 508 and at least one first bypass capacitor 510. The first coupled-inductor may include at least two magnetically coupled windings 512, 514. Two or more windings may share a common core. The magnetically coupled windings may each be wrapped around a core such that the current and voltages of the windings are in phase, as indicated by the dots on the same ends of the windings. Additionally or alternatively, two or more of the at least two windings may be wound on different cores. In some examples, the passive filter may include one less bypass capacitor than a number of the at least two windings. The bypass capacitor (e.g., a DC blocking capacitor) may be coupled in series with a corresponding winding of the at least two windings to define multiple series resonant circuits having multiple determined notch frequencies. For example, the passive filter may include five magnetically coupled windings and four bypass capacitors, where the second through fifth windings 514A, 514B, 514C, 514D are coupled in series with a corresponding one of the four bypass capacitors 510A, 510B, 510C, 510D to form four series resonant circuits. Each series resonant circuit may be tuned to a different determined notch frequency. A first, dotted end of the first coupled-inductor may be coupled to a first node 515 of the passive filter. The bypass capacitor may be coupled between a second, undotted end of the first coupled-inductor and a second node 517 of the passive filter. The first node may be coupled to the first rail and the second node coupled to the second rail of the DC bus. Further, when additional strings of batteries in series and/or parallel are added, additional first coupled-inductors and/or additional first bypass capacitors may be utilized as will be described in further detail herein.

The passive filter may attenuate, reduce, or eliminate alternating currents (e.g., ripple currents) at or near the determined notch frequencies of the series resonant circuits that may be generated by the inverter or otherwise, at the energy storage device. The passive filter receives the direct current and alternating currents from the inverter and outputs the direct current to the energy storage device. The alternating currents are reduced or eliminated at the energy storage device by the passive filter. In operation, the first winding of the coupled-inductor conducts the direct current on the DC bus to the energy storage device, while the bypass capacitors 510A, 510B, 510C, 510D (e.g., the DC blocking capacitors) shunt the alternating current to the respective second windings 514A, 514B, 514C, 514D of the coupled-inductor based on which series resonant circuit offers the lowest impedance pathway for the alternating current. The passive filter provides greater attenuation of alternating currents (e.g., ripple currents) at or near the multiple determined notch frequencies compared to some known filters receiving the same voltage and currents, such as lumped inductors. The determined notch frequencies of the series resonant circuit may correspond to multiple values or ranges of values of switching frequencies, modes of operation, or other operational parameters of the inverter. For example, in some applications, the voltage magnitude and the ripple frequency may vary depending on the drive speed, drive power, drive switching frequency, drive mode of operation, etc. In addition, there may be multiple frequencies present at the DC bus of the power converter system. For example, in square wave operation, or a six step operation, of a power converter system all multiples of a $6^{th}$ harmonic of the motor are present on the DC bus (6th, $12^{th}$, 18th etc. harmonic of the motor fundamental). The multiple determined notch frequencies may be determined accordingly. By providing passive attenuation of alternating currents at multiple determined notch frequencies, the voltage applied to the at least one energy storage device may be maintained relatively constant, significantly reducing ripple current at the at least one energy storage device. Additionally or alternatively, the size and/or weight of the passive filter may be reduced by up to 25% as compared to some known filters, such as lumped inductors. Further additionally or alternatively, based on a common size and/or weight, the passive filter may reduce more ripple current as compared to some known filters receiving the same voltage and currents, such as lumped inductors.

Figure 6:
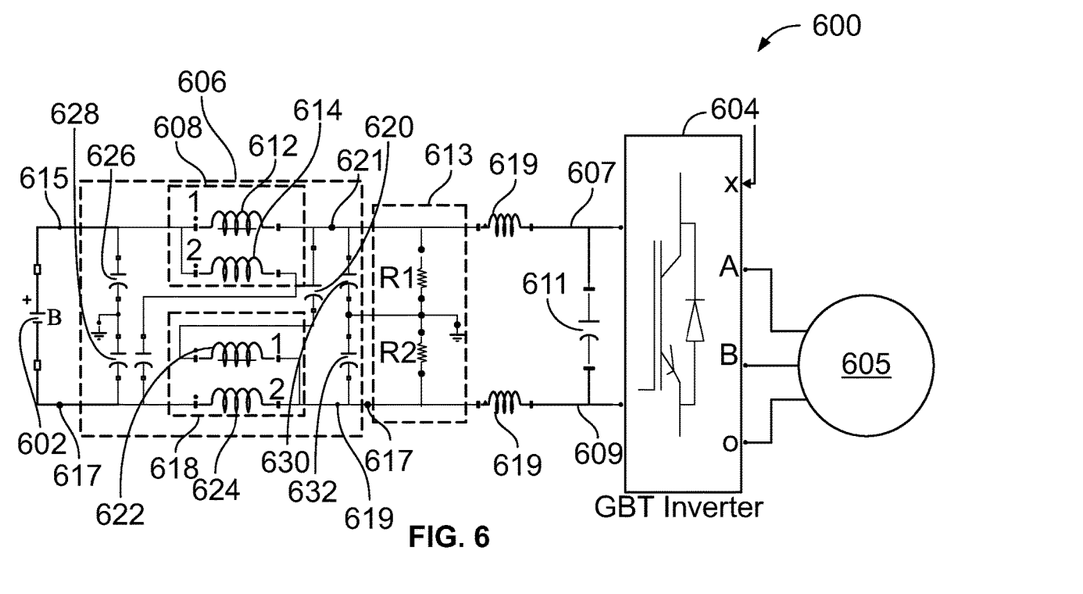
FIG. 6 illustrates a schematic diagram of another example power converter system.

FIG. 6 illustrates a schematic diagram of another example power converter system 600. The elements of FIG. 6 with similar numbers to FIGS. 4A-5B are as described with respect to FIGS. 4A-5B except as indicated otherwise. Coupled between the at least one energy storage device 602 and inverter 604 is passive filter 606. The passive filter 606 may include a first coupled-inductor 608 and a first bypass capacitor 610, as well as a second coupled-inductor 618 and a second bypass capacitor 620. The first coupled-inductor may include at least two magnetically coupled windings 612, 614. Likewise, the second coupled-inductor may include at least two magnetically coupled windings 622, 624. Two or more of the at least two windings of the first coupled-inductor and/or the second coupled-inductor may share a common core. Additionally or alternatively, two or more of the at least two windings of the first coupled-inductor and/or the second coupled-inductor may be wound on different cores. In some examples, the passive filter may include one less first or second bypass capacitor than a number of the at least two windings 612, 614, 622, 624 of the respective one of the first coupled-inductor and the second coupled-inductor. The first bypass capacitor (e.g., a DC blocking capacitor) may be coupled in series with a corresponding winding of the at least two windings of the first coupled-inductor 608 to define multiple series resonant circuits having multiple determined notch frequencies. Likewise, the second bypass capacitor (e.g., a DC blocking capacitor) may be coupled in series with a corresponding winding of the at least two windings of the first coupled-inductor to define multiple series resonant circuits having multiple determined notch frequencies. Each series resonant circuit may be tuned to a determined notch frequency.

A first, dotted end of the first coupled-inductor may be coupled to a first node 615 of the passive filter. The first bypass capacitor may be coupled between a second, undotted end of the first coupled-inductor and a second node 617 of the passive filter. The first node may be coupled to a first rail 607 and the second node coupled to a second rail 609 of the DC bus. A first, dotted end of the second coupled-inductor may be coupled to a third node 619 of the passive filter. The second bypass capacitor 620 may be coupled between a second, undotted end of the second coupled-inductor 618 and a fourth node 621 of the passive filter 606. The third node may be coupled to the second rail and the second node coupled to the first rail of the DC bus. Accordingly, the first coupled-inductor and the first bypass capacitor are oriented opposite the second coupled-inductor and the second bypass capacitor with respect to the DC bus. Additionally or alternatively, the first coupled-inductor and the first bypass capacitor and the second coupled-inductor and the second bypass capacitor may be configured to attenuate ripple currents. For purposes of illustration only, the ripple voltage may be +/−70 volts (V) while the ripple current may be +/−280 Amps (A). The passive filter may further include a first pair of capacitors 626, 628 implemented in series between the first and second nodes, and tied to ground. The winding of the first coupled-inductor and the winding of the second coupled-inductor, along with the first pair of capacitors form a common mode filter. Additionally or alternatively, the passive filter 606 may further include a second pair of capacitors 630, 632 implemented in series between the third and fourth nodes and tied to ground. The second pair of capacitors operate to provide additional filtering of common mode noise between the positive and negative rails of the DC bus and ground.

The passive filter may operate to reduce or eliminate alternating currents (e.g., ripple currents) at the energy storage device by attenuating ripple currents at or near the pair of notch frequencies of the series resonant circuits. In operation, the first winding of the first coupled-inductor and/or the first winding of the second coupled-inductor pass the direct current on the DC bus, while the first bypass capacitor and/or the second bypass capacitor shunt the alternating current to the respective second windings based on which series resonant circuit offers the lowest impedance pathway for the alternating current. The passive filter may attenuate alternative current. It may provide greater attenuation of alternating currents at or near the multiple determined notch frequencies compared to some known filters receiving the same voltage and currents, such as lumped inductors. The determined notch frequencies of the series resonant circuits may correspond pair of values or ranges of values of switching frequencies of the inverter. By providing passive attenuation of alternating currents due to the inverter switching frequency, the voltage applied to the energy storage device may be maintained relatively constant, significantly reducing ripple current at the at least one energy storage device. Additionally or alternatively, the size and/or weight of the passive filter may be reduced by up to 60% as compared to some known filters, such as lumped inductors. Further additionally or alternatively, based on a common size and/or weight, the passive filter may reduce more ripple current as compared to some known filters receiving the same voltage and currents, such as lumped inductors.

Figure 7A:
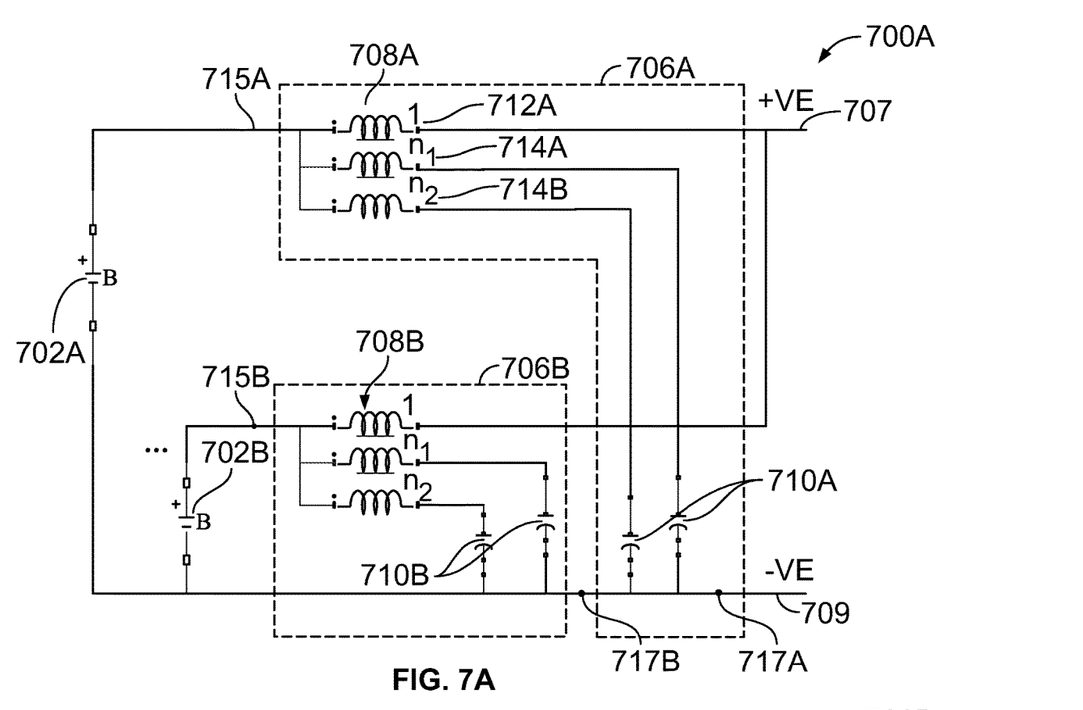
FIG. 7A illustrates a schematic diagram of another example power converter system.

FIG. 7A illustrates a schematic diagram of another example power converter system 700A that provides plural energy storage devices 702A, 702B that may be coupled to one another in a parallel arrangement and to an inverter (not shown). The power converter system also includes plural passive filters 706A, 706B. Each of the plural energy storage devices 702A, 702B is coupled to one of the plural passive filters 706A, 706B. The elements of FIG. 7A with similar numbers to FIGS. 4A-5B are as described with respect to FIGS. 4A-5B except as indicated otherwise. The example power converter system 700A may be implemented with either grounding scheme illustrated in FIGS. 5A and 5B. The parallel arrangement of the plural energy storage devices 702A, 702B may be coupled between the first and second rails 707, 709 of the DC bus.

Coupled between each of the plural energy storage devices 702A, 702B and the inverter is a corresponding passive filter 706A, 706B. Each passive filter 706A, 706B may include a coupled-inductor 708A, 708B and at least one corresponding bypass capacitor 710A, 710B. Each coupled-inductor 708A, 708B may include at least two magnetically coupled windings 712, 714A, 714B. In some examples, each passive filter 706A, 706B may include one less corresponding bypass capacitor 710A, 710B than a number of the at least two windings 712, 714. The corresponding bypass capacitor 710A, 710B (e.g., a DC blocking capacitor) may be coupled in series with an undotted end of a corresponding winding of the at least two windings 712, 714A, 714B to define multiple series resonant circuits having multiple determined notch frequencies, as described with respect to FIG. 5A. A first, dotted end of each coupled-inductor 708A, 708B may be coupled to a corresponding first node 715A, 715B of the passive filter. Each of the bypass capacitors 710A, 710B may be coupled between the undotted end of the corresponding coupled-inductor 708A, 708B and a corresponding second node 717A, 717B of the passive filter. The first nodes 715A, 715B may be coupled to the first rail 707 and the second nodes 717A, 717B may be coupled to the second rail 709 of the DC bus. The passive filters 706A, 706B operate to reduce or eliminate alternating currents (e.g., ripple currents) at the corresponding energy storage devices 702A, 702B by attenuating ripple currents at or near the determined notch frequencies of the series resonant circuits. By providing passive attenuation of alternating currents, the voltage applied to the plural energy storage devices 702A, 702B may be maintained relatively constant, significantly reducing ripple current at the plural energy storage devices 702A, 702B.

Figure 7B:
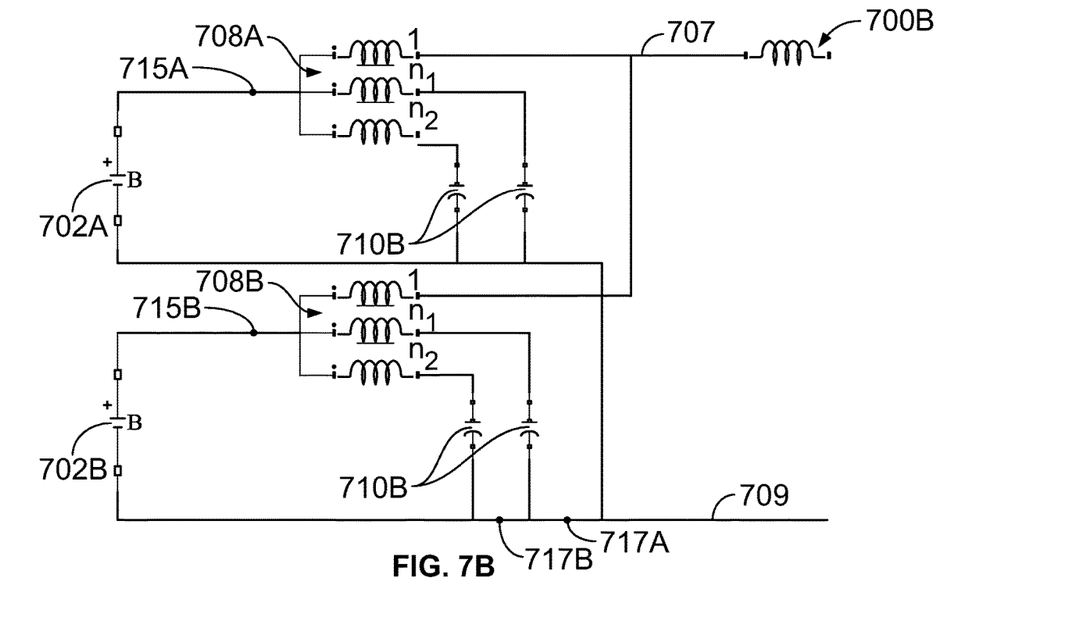
FIG. 7B illustrates a schematic diagram of an example of a passive filter device configured to be retrofitted into an existing power converter system.

FIG. 7B illustrates a schematic diagram of another example power converter system 700B having a passive filter device including plural passive filters 706A, 706B configured to be retrofit between plural energy storage devices 702A, 702B and an existing prior art filter 740 (e.g., a lumped reactor, a DC choke, or the like). The existing prior art filter is further coupled to an inverter (not shown). The elements of FIG. 7B with the same numbers as FIG. 7A are as described with respect to FIG. 7A. By retrofitting passive filters 706A, 706B in existing power converter systems, ripple current at the plural energy storage devices 702A, 702B may be further reduced within the system.

Figure 8:
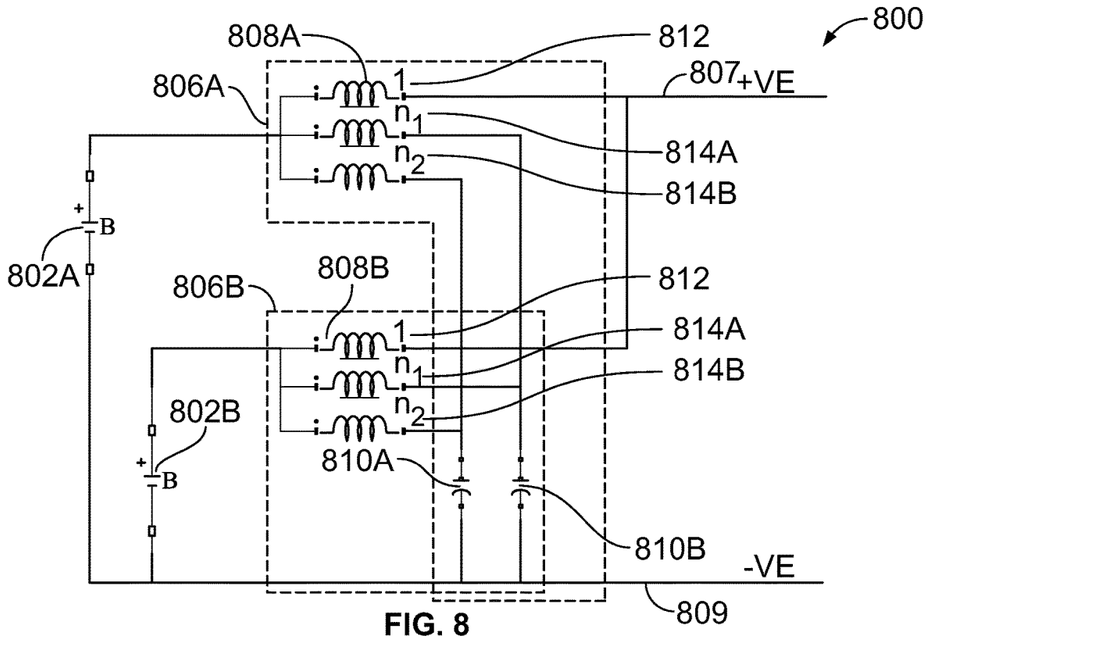
FIG. 8 illustrates a schematic diagram of another example power converter system.

FIG. 8 illustrates a schematic diagram of another example power converter system 800 that provides plural energy storage devices 802A, 802B that may be coupled to one another in a parallel arrangement and to an inverter (not shown). The power converter system may include plural passive filters 806A, 806B that may share at least one bypass capacitor 810A, 810B. Each of the plural energy storage devices 802A, 802B is coupled to one of the plural passive filters 806A, 806B. The elements of FIG. 8 with similar numbers to FIGS. 4A-5B are as described with respect to FIGS. 4A-5B except as indicated otherwise. The example power converter system may be implemented with either grounding scheme illustrated in FIGS. 5A and 5B. The parallel arrangement of the plural energy storage devices 802A, 802B may be coupled between the first and second rails 807, 809 of the DC bus.

Coupled between each of the plural energy storage devices 802A, 802B and the inverter is a corresponding passive filter 806A, 806B. Each passive filter 806A, 806B may include a coupled-inductor 808A, 808B and at least one bypass capacitor 810A, 810B. Each passive filter 806A, 806B shares the bypass capacitor 810A, 810B. Each coupled-inductor 808A, 808B may include at least two magnetically coupled windings 812, 814A, 814B. In some examples, each passive filter 806A, 806B may include one less bypass capacitor 810A, 810B than a number of the at least two windings 812, 814A, 814B. The bypass capacitor 810A, 810B (e.g., a DC blocking capacitor) may be coupled in series with an undotted end of a corresponding winding of the at least two windings 812, 814A, 814B to define multiple series resonant circuits having multiple determined notch frequencies, as described with respect to FIG. 5A. A first, dotted end of each coupled-inductor 808A, 808B may be coupled to a corresponding first node 815A, 815B of the passive filter. Each of the bypass capacitor 810A, 810B may be coupled between the undotted end of the corresponding coupled-inductor 808A, 808B and a corresponding second node 817A, 817B of the passive filter. The first nodes 815A, 815B may be coupled to the first rail 807 and a shared second node 817 may be coupled to the second rail 809 of the DC bus. The passive filters 806A, 806B operate to reduce or eliminate alternating currents (e.g., ripple currents) at the corresponding energy storage devices 802A, 802B by attenuating ripple currents at or near the determined notch frequencies of the series resonant circuits. By providing passive attenuation of alternating currents, the voltage applied to the plural energy storage devices may be maintained relatively constant, significantly reducing ripple current at the plural energy storage devices 802A, 802B. Furthermore, by implementing plural passive filters with shared bypass capacitors, the size and/or weight and/or part count of the plural passive filters may be reduced.

Figure 9:
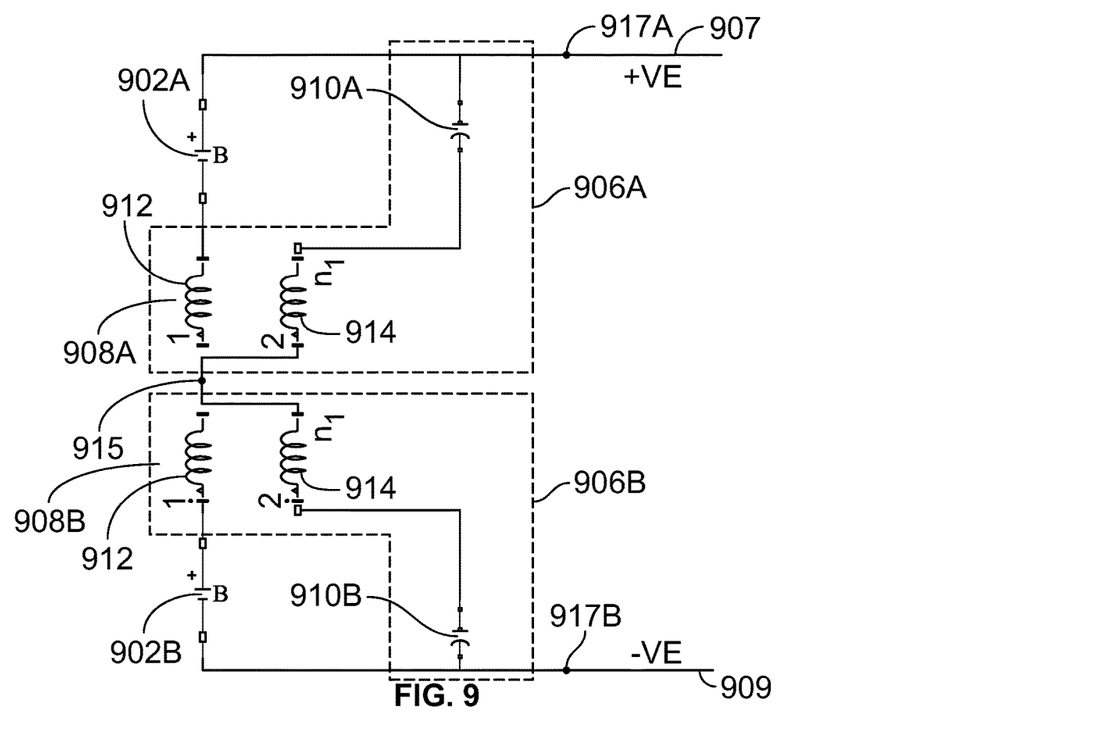
FIG. 9 illustrates a schematic diagram of another example power converter system.

FIG. 9 illustrates a schematic diagram of another example power converter system 900 that provides plural energy storage devices 902A, 902B that may be coupled to one another in a series arrangement and to an inverter (not shown). The power converter system may include plural passive filters 906A, 906B. Each of the plural energy storage devices may be coupled to one of the plural passive filters. The elements of FIG. 9 with similar numbers to FIGS. 4A-5B are as described with respect to FIGS. 4A-5B except as indicated otherwise. The example power converter system 900 may be implemented with either grounding scheme illustrated in FIGS. 5A and 5B. The series arrangement of the plural energy storage devices 902A, 902B may be coupled between the first and second rails 907, 909 of the DC bus.

Coupled between one or more pairs of the plural energy storage devices 902A, 902B and the inverter are corresponding passive filters 906A, 906B. Each passive filter may include a coupled-inductor 908A, 908B and at least one corresponding bypass capacitor 910A, 910B. The corresponding bypass capacitor may be coupled in series with a second end of a corresponding winding of the at least two windings 912, 914 to define at least one series resonant circuit having a determined notch frequency. A first end of each coupled-inductor may be coupled to a common first node 915. The bypass capacitor 910A may be coupled between the second end of the coupled-inductor 908A and a corresponding second node 917A of the passive filter 906A. The second node 917A may be coupled to the first rail 907 of the DC bus. Conversely, the bypass capacitor 910B may be coupled between the second end of the coupled-inductor 908B and a corresponding second node 917B of the passive filter 906B. The second node 917B may be coupled to the second rail 909 of the DC bus. Due to the opposing orientation of the passive filters 906A, 906B with respect to the DC bus, the value of the voltage of each of the corresponding bypass capacitor may be reduced (e.g., halved) relative to other examples herein and/or some known power converter systems.

Figure 10:
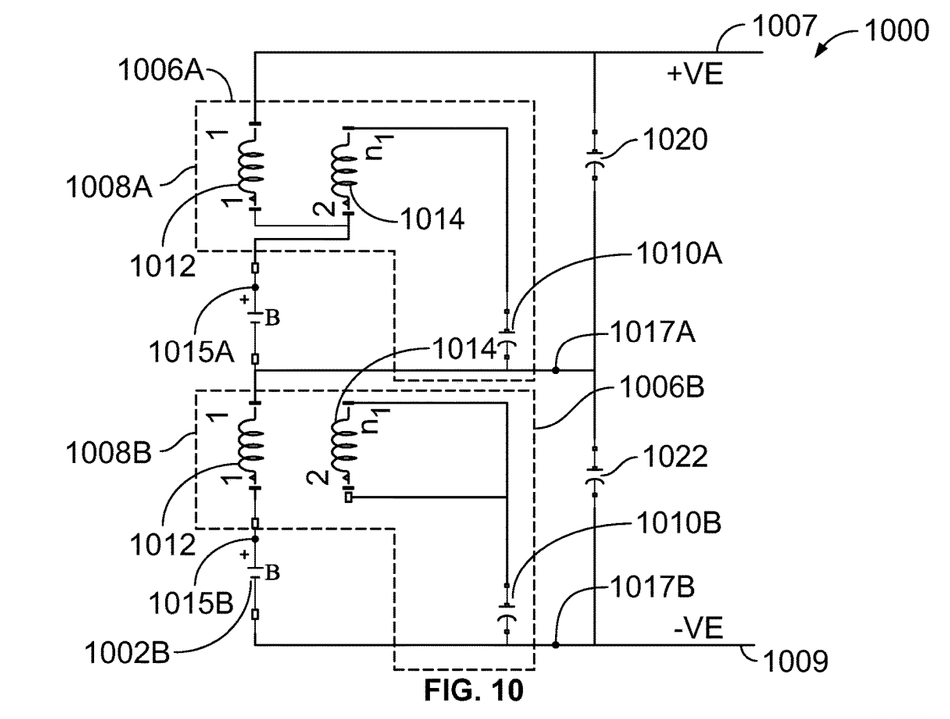
FIG. 10 illustrates a schematic diagram of another example power converter system.

FIG. 10 illustrates a schematic diagram of another example power converter system 1000 that provides plural energy storage devices 1002A, 1002B that may be coupled to one another in a series arrangement and to an inverter (not shown). The power converter system 1000 also includes plural passive filters 1006A, 1006B. Each of the plural energy storage devices 1002A, 1002B is coupled to one of the plural passive filters 1006A, 1006B. The elements of FIG. 10 with similar numbers to FIGS. 4A-5B are as described with respect to FIGS. 4A-5B except as indicated otherwise. The example power converter system 1000 may be implemented with either grounding scheme illustrated in FIGS. 5A and 5B. The series arrangement of the plural energy storage devices 1002A, 1002B may be coupled between the first and second rails 1007, 1009 of the DC bus.

Coupled between each of the plural energy storage devices 1002A, 1002B and the inverter are corresponding passive filters 1006A, 1006B. Each passive filter 1006A, 1006B may include a coupled-inductor 1008A, 1008B and at least one corresponding bypass capacitor 1010A, 1010B. The corresponding bypass capacitor 1010A, 1010B may be coupled in series with a second end of a corresponding winding of the at least two windings 1012, 1014 to define at least one series resonant circuit having a determined notch frequency. A first end of each coupled-inductor 1008A, 1008B may be coupled to a corresponding first node 1015A, 1015B. The bypass capacitor 1010A may be coupled between the second end of the corresponding coupled-inductor 1008A, 1008B and a corresponding second node 1017A, 1017B of the passive filter 1006A, 1006B. The first nodes 1015A, 1015B may be implemented in series and to a common side of the plural energy storage devices 1002A, 1002B. The second nodes 1017A, 1017B may be coupled between second, opposing sides of the plural energy storage devices 1002A, 1002B and on a common side of plural linking capacitors 1020, 1022 with respect to the first and second rails 1007, 1009 of the DC bus. Due to the arrangement of the passive filters 1006A, 1006B with respect to the plural linking capacitors 1020, 1022 and the DC bus, the value of the voltage of the plural linking capacitors 1020, 1022 may be reduced may be reduced (e.g., halved) relative to other examples herein and/or some known power converter systems, as may be useful in high voltage applications.

Figure 11:
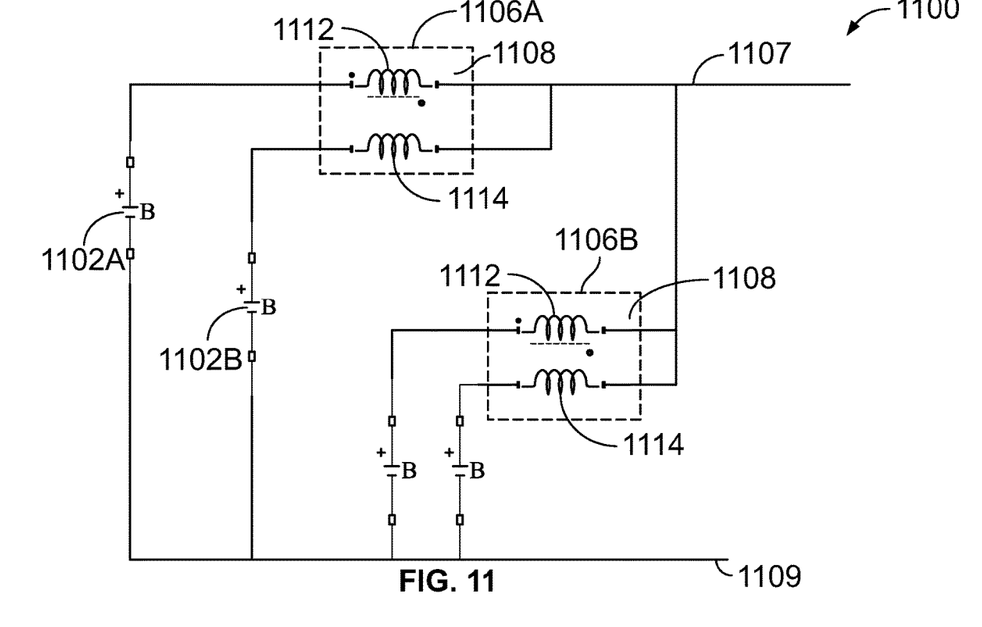
FIG. 11 illustrates a schematic diagram of another example power converter system.

FIG. 11 illustrates a schematic diagram of another example power converter system 1100 that provides at least two pairs of energy storage devices 1102A, 1102B, 1102C, 1102D that may be coupled to one another in a parallel arrangement and to an inverter (not shown) via the rails 1107, 1109 of a DC bus. The elements of FIG. 11 with similar numbers to FIGS. 4A-5B are as described with respect to FIGS. 4A-5B except as indicated otherwise. The example power converter system 1100 may be implemented with either grounding scheme illustrated in FIGS. 5A and 5B. The parallel arrangement of the plural energy storage devices 1102A, 1102B may be coupled between the first and second rails 1107, 1109 of the DC bus.

The power converter system 1100 also includes passive filters 1106A and 1106B coupled between a corresponding pair of energy storage devices (1102A and 1102B or 1102C and 1102D) and the DC bus. Each passive filter 1106A, 1106B may include a coupled-inductor 1108. Each coupled-inductor 1108 may include a first winding 1112 having a first polarity (as indicated by the dotted end) connected in series to a first energy storage device 1102A, 1102C and a second winding 1114 having a second polarity (as indicated by the opposite dotted end) connected in series to a second energy storage device 1102B, 1102D of the pair of energy storage devices. The opposite polarity of the first and second windings 1112, 1114 operate to reduce or eliminate alternating currents (e.g., ripple currents) at the energy storage device by canceling the ripple currents passed and/or stored on the coupled-inductor 1108. By providing passive cancellation of alternating currents, the voltage applied to each pair of energy storage devices (1102A and 1102B or 1102C and 1102D) may be maintained relatively constant, significantly reducing ripple current at the energy storage device 1102A, 1102B, 1102C, 1102D.

Embodiments herein may include a method of forming a power converter system. The method, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. The method includes coupling a passive filter between an energy storage device and an inverter electrically coupled to the energy storage device. The passive filter includes a first coupled-inductor and at least one first bypass capacitor. The first coupled-inductor includes at least two magnetically coupled winding. The passive filter is configured to reduce or eliminate alternating current at the energy storage device.

In accordance with one or more embodiments, a system may be provided that includes an energy storage device, and an inverter electrically coupled to the energy storage device. The system also includes a passive filter electrically coupled between the energy storage device and the inverter. The passive filter includes a first coupled-inductor and at least one first bypass capacitor. The first coupled-inductor includes at least two magnetically coupled windings. The passive filter is configured to reduce or eliminate alternating current at the energy storage device. The windings may be separate in that the at least two windings are not merely two different loops around a common axis of the same conductive body or wire. Instead, the windings may be two separate conductive bodies each winding around the same or different core.

The inverter can be a traction inverter configured to output the AC to a traction motor of a vehicle. The passive filter can include one fewer bypass capacitor than the number (e.g., how many) of the at least two magnetically coupled windings that are included in the filter. For example, the number of bypass capacitors in the passive filter can be at least one less than the number of windings (e.g., if there are two windings, then there is one bypass capacitor; if there are three windings, there can be up to two bypass capacitors; and the like). Each of the at least one first bypass capacitor(s) is coupled in series with a corresponding winding of the windings to define a series resonant circuit having a determined notch frequency. The passive filter can include a second coupled-inductor and at least one second bypass capacitor, where a first magnetically coupled winding of the first coupled-inductor, a first magnetically coupled winding of the second coupled-inductor, the at least one first bypass capacitor, and the at least one second bypass capacitor are configured to form a common mode filter.

The second coupled-inductor can include at least two magnetically coupled windings and the passive filter can include one fewer second bypass capacitor than the number magnetically coupled windings. Each of the at least one second bypass capacitor(s) can be coupled in series with a corresponding winding of the magnetically coupled windings to define a series resonant circuit having a determined notch frequency. The system also can include additional energy storage devices and plural passive filters, where each of the energy storage devices is electrically coupled to at least one passive filter. The energy storage devices can be electrically coupled with each other in parallel.

The system can include one or more additional energy storage devices, and the passive filter can also include plural first coupled-inductors, with each of the energy storage devices being electrically coupled to a corresponding first coupled-inductor of the plural first coupled-inductors and the at least one first bypass capacitor. The energy storage devices can be electrically coupled in parallel to each other. The passive filter can include one fewer first bypass capacitor than the magnetically coupled windings, with each of the first bypass capacitor(s) coupled in series with a corresponding winding of the magnetically coupled windings to define a series resonant circuit having a determined notch frequency. The magnetically coupled windings can share a common core. The system also can include a ground and a link capacitor that are electrically coupled to a positive and negative rail of a direct current bus. The ground can be a midpoint ground. The capacitance value of the first bypass capacitor can be from 0.1 to 10 times the capacitance value of the link capacitor.

In accordance with one or more embodiments, a passive filter device may be provided that includes a passive filter having a first coupled-inductor and at least one first bypass capacitor. The first coupled-inductor includes at least two magnetically coupled windings. The passive filter also includes one fewer first bypass capacitor than the number of magnetically coupled windings. Each of the at least one first bypass capacitor(s) is coupled in series with a corresponding winding of the at least two magnetically coupled windings to define a series resonant circuit having a determined notch frequency. The passive filter is configured to be insertable in a power converter system including an energy storage device coupled to a converter and a lumped reactor. The passive filter may reduce or eliminate alternating current at the energy storage device.

Optionally, the passive filter can be electrically coupled between the energy storage device and the lumped reactor of the system. The passive filter can include a second coupled-inductor and at least one second bypass capacitor configured to form a common mode filter. The second coupled-inductor can include at least two magnetically coupled windings and the passive filter can include one fewer of the at least one second bypass capacitor than the at least two magnetically coupled windings, with each of the at least one second bypass capacitor coupled in series with a corresponding winding of the at least two magnetically coupled windings to define a series resonant circuit having a determined notch frequency.

In accordance with one embodiment, a system may be provided that includes at least two energy storage devices (e.g., batteries) connected in series and an inverter electrically coupled to the energy storage devices. The system also includes at least one passive filter electrically coupled between the energy storage devices and between (a) the two energy storage devices and (b) the inverter. The at least one passive filter includes a first coupled-inductor and a second coupled-inductor. The first coupled-inductor and the second coupled-inductor each include at least two magnetically coupled windings. The passive filter is configured to reduce or eliminate alternating current at the energy storage devices. Optionally, the inverter is a traction inverter configured to output the alternating current for a traction motor of a vehicle.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   an energy storage device;
   an inverter electrically coupled to the energy storage device; and
   a passive filter electrically coupled between the energy storage device and the inverter, the passive filter including a first coupled-inductor and at least one first bypass capacitor, the first coupled-inductor including at least two magnetically coupled windings, the passive filter configured to reduce or eliminate alternating current at the energy storage device, wherein the passive filter includes a second coupled-inductor and at least one second bypass capacitor, wherein a first magnetically coupled winding of the first coupled-inductor, a first magnetically coupled winding of the second coupled-inductor, the at least one first bypass capacitor, and the at least one second bypass capacitor are configured to form a common mode filter.

2. The system of claim 1, wherein the passive filter is configured to attenuate of ripple currents at or near determined frequencies.

3. The system of claim 1, wherein the passive filter includes one less of the at least one first bypass capacitor than a number of the at least two magnetically coupled windings, each of the at least one first bypass capacitor coupled in series with a corresponding winding of the at least two magnetically coupled windings to define a series resonant circuit having a determined notch frequency.

4. The system of claim 1, wherein the second coupled-inductor includes at least two magnetically coupled windings and the passive filter includes one less of the at least one second bypass capacitor than a number of the at least two magnetically coupled windings, each of the at least one second bypass capacitor coupled in series with a corresponding winding of the at least two magnetically coupled windings to define a series resonant circuit having a determined notch frequency.

5. The system of claim 1, further comprising additional energy storage devices and plural passive filters, wherein each of the energy storage devices is electrically coupled to at least one passive filter of the plural passive filters.

6. The system of claim 5, wherein the energy storage devices are electrically coupled together in parallel with each other.

7. The system of claim 1, further comprising additional energy storage devices, and the passive filter further comprises plural first coupled-inductors, wherein each of the energy storage devices is electrically coupled to a corresponding first coupled-inductor of the plural first coupled-inductors and the at least one first bypass capacitor.

8. The system of claim 7, wherein the energy storage devices are electrically coupled together in parallel with each other.

9. The system of claim 7, wherein the passive filter includes one less of the at least one first bypass capacitor than a number of the at least two magnetically coupled windings, each of the at least one first bypass capacitor coupled in series with a corresponding winding of the at least two magnetically coupled windings to define a series resonant circuit having a determined notch frequency.

10. The system of claim 1, wherein the at least two magnetically coupled windings share a common core.

11. The system of claim 1, further comprising a conductive pathway configured to be connected ground and a link capacitor that is electrically coupled to a positive and a negative rail of a direct current bus.

12. The system of claim 11, wherein the conductive pathway is implemented at a midpoint of the positive and the negative rail of a direct current bus.

13. The system of claim 11, wherein a capacitance value of the first bypass capacitor is from 0.1 to 10 times the capacitance value of the link capacitor.

14. A passive filter device, comprising:
    a passive filter including a first coupled-inductor and at least one first bypass capacitor, the first coupled-inductor including at least two magnetically coupled windings, the passive filter including one less of the at least one first bypass capacitor than a number of the at least two magnetically coupled windings, each of the at least one first bypass capacitor coupled in series with a corresponding winding of the at least two magnetically coupled windings to define a series resonant circuit having a determined notch frequency, wherein the passive filter is configured to be insertable in a power converter system including an energy storage device coupled to a converter and a lumped reactor, the passive filter to attenuate, reduce or eliminate ripple current at the energy storage device.

15. The passive filter device of claim 14, wherein the passive filter is configured to be electrically coupled between the energy storage device and the lumped reactor of the system.

16. The passive filter device of claim 14, wherein the passive filter includes a second coupled-inductor and at least one second bypass capacitor configured to form a common mode filter.

17. The passive filter device of claim 16, wherein the second coupled-inductor includes at least two magnetically coupled windings and the passive filter includes one less of the at least one second bypass capacitor than a number of the at least two magnetically coupled windings, each of the at least one second bypass capacitor coupled in series with a corresponding winding of the at least two magnetically coupled windings to define a series resonant circuit having a determined notch frequency.

18. A system, comprising:
   at least two energy storage devices connected in series;
   an inverter electrically coupled to the at least two energy storage devices; and
   at least one passive filter electrically coupled between the at least two energy storage devices and between the at least two energy storage devices and the inverter, the at least one passive filter including a first coupled-inductor and a second coupled-inductor, the first coupled-inductor and the second coupled-inductor each including at least two magnetically coupled windings, the passive filter configured to reduce or eliminate alternating current at the at least two energy storage devices.

19. The system of claim 18, wherein the inverter is a traction inverter configured to output the alternating current for a traction motor of a vehicle.

\* \* \* \* \*